US012529808B2

(12) United States Patent
Kiisk et al.

(10) Patent No.: US 12,529,808 B2
(45) Date of Patent: Jan. 20, 2026

(54) DETECTOR UNIT, HODOSCOPE AND SYSTEM FOR TRACKING HIGH ENERGY PARTICLES

(71) Applicant: GScan OÜ, Tallinn (EE)

(72) Inventors: Madis Kiisk, Tartu County (EE); Tõnu Lepp, Tartu (EE); Vitali Pastsuk, Tartu County (EE); Jaan Štubis, Võru Parish (EE); Märt Mägi, Harju County (EE); Mats Mikkor, Viljandi County (EE); Arne Ingalt, Saare County (EE)

(73) Assignee: GScan OÜ, Tallinn (EE)

( * ) Notice: Subject to any disclaimer, the term of this patent is extended or adjusted under 35 U.S.C. 154(b) by 143 days.

(21) Appl. No.: 18/524,966

(22) Filed: Nov. 30, 2023

(65) Prior Publication Data

US 2024/0184002 A1    Jun. 6, 2024

(30) Foreign Application Priority Data

Dec. 5, 2022    (EP) ..................... 22211276

(51) Int. Cl.
*G01T 5/00*    (2006.01)
(52) U.S. Cl.
CPC .................... *G01T 5/002* (2013.01)
(58) Field of Classification Search
CPC ................. G01T 5/002; G01C 5/00
See application file for complete search history.

(56) References Cited

U.S. PATENT DOCUMENTS 7,531,791 B2 *    5/2009    Bryman .................. G01T 1/203
250/266

FOREIGN PATENT DOCUMENTS

CN    119459091 A  *  2/2025  ............... B29D 7/00

OTHER PUBLICATIONS

CN_119459091 (Year: 2025).*
Clarkson A et al: "The design and performance of a scintillating-fibre tracker for the cosmic-ray muon tomography of legacy nuclear waste containers", Nuclear Instruments & Methods in Physics Research. Section A, vol. 745, Feb. 7, 2014 (Feb. 7, 2014), pp. 138-149, XP028630055, ISSN: 0168-9002, DOI: 10.1016/J.NIMA.2014.01.062, 12 pages.
European Patent Office, European Search Report, Application No. 22211276.5, Dated May 23, 2023, 8 pages.

(Continued)

*Primary Examiner* — David J Makiya
*Assistant Examiner* — Fani Polyzos Boosalis
(74) *Attorney, Agent, or Firm* — Ziegler IP Law Group, LLC.

(57) ABSTRACT

Disclosed is a detector unit for tracking high energy particles, which has a first panel having a first surface, a second surface and a first support member. The detector unit also has a second panel having a first surface, a second surface and a second support member. The detector unit further includes a plurality of first fibres and a plurality of second fibres. The first panel is stacked upon the second panel such that second surface of first panel and second surface of second panel are facing each other. The plurality of first fibres and the plurality of second fibres have two or more layers of first fibres and second fibres, respectively, arranged in an interlocking manner in a first set and a second set of parallel grooves of the first panel and the second panel, respectively.

16 Claims, 5 Drawing Sheets

(56) References Cited

OTHER PUBLICATIONS

Gholamreza Anbarjafari et al: "Atmospheric ray tomography for low-Z materials: implementing new methods on a proof-of-concept tomograph", arxiv.org, Cornell University Library, 201 Olin Library Cornell University Ithaca, NY 14853, Mar. 1, 2021 (Mar. 1, 2021), XP081903583, 14 pages.

* cited by examiner

DETECTOR UNIT, HODOSCOPE AND SYSTEM FOR TRACKING HIGH ENERGY PARTICLES

TECHNICAL FIELD

The present disclosure relates to a detector unit for tracking high energy particles. The present disclosure also relates to a hodoscope for tracking high energy particles. The present disclosure also relates to a system for tracking high energy particles.

BACKGROUND

The use of particles for tracking has been long known. Typically, the particles produced by collisions between high energy particles and Earth's atmosphere travel in straight lines, but in the presence of a magnetic field, the charged particles change their path and travel in a curved path. Notably, in these detectors, the particles with high momentum travel in straight lines, and the particle with low momentum move in spirals.

Conventional tracking systems are established to determine the properties and type of particles. Moreover, the conventional tracking systems determine the path of the particle, track the particle and measure the energy of the particle. However, the conventional system fails to separate the wide range of high energy particles' kinetic energy spectrum. The conventional tracking systems require high voltage supply and periodic maintenance for effective operation.

Therefore, in light of the foregoing discussion, there exists a need to overcome the aforementioned drawbacks associated with the conventional tracking systems.

SUMMARY

The present disclosure seeks to provide a detector unit for tracking high energy particles. The present disclosure also seeks to provide a hodoscope for tracking high energy particles. The present disclosure also seeks to provide a system for tracking high energy particles. The aim of the present disclosure is to provide a solution that at least partially overcomes the problems encountered in prior art.

In first aspect, an embodiment of the present disclosure provides a detector unit for tracking high energy particles, the detector unit comprising:
  a first panel having a first surface and a second surface opposite to the first surface, wherein the second surface of the first panel includes a first set of parallel grooves,
  a first support member arranged between the first surface and the second surface of the first panel,
  a second panel having a first surface and a second surface opposite to the first surface, wherein the second surface of the second panel includes a second set of parallel grooves,
  a second support member arranged between the first surface and the second surface of the second panel,
  a plurality of first fibres arranged in the first set of parallel grooves of the first panel; and
  a plurality of second fibres arranged in the second set of parallel grooves of the second panel;
  wherein the first panel is stacked upon the second panel so that the second surface of the first panel and the second surface of the second panel are facing each other,
  wherein the first set of parallel grooves and the second set of parallel grooves are configured in a lengthwise direction and arranged at an angle to each other,
  wherein the plurality of the first fibres comprises two or more layers of first fibres arranged in an interlocking manner in the first set of parallel grooves of the first panel,
  wherein the plurality of the second fibres comprises two or more layers of second fibres arranged in the interlocking manner in the second set of parallel grooves of the second panel, and
  wherein the first support member and second support member include a honeycomb or a foam structure and are fabricated with a material selected from at least one of: foam, plastics, paper, wood material, metal material, composite material, or any combination thereof.

In second aspect, an embodiment of the present disclosure provides a hodoscope for tracking high energy particles, the hodoscope comprising:
  at least two detector units according to the first aspect, wherein at least two detector units are stacked in a spaced apart manner; and
  a supporting arrangement for supporting at least two detector units in a spaced apart manner.

In third aspect, an embodiment of the present disclosure provides a system for tracking high energy particles, the system comprising:
  at least two hodoscopes according to the second aspect; and
  a processor operatively coupled to the at least two hodoscopes to receive a sensed data to analyse a sample.

In fourth aspect, an embodiment of the present disclosure provides a detector unit for tracking high energy particles, characterized in that the detector unit comprising:
  a first panel having a first surface and a second surface opposite to the first surface,
  a first support member arranged between the first surface and the second surface of the first panel,
  a second panel having a first surface and a second surface (108B) opposite to the first surface,
  a second support member arranged between the first surface and the second surface of the second panel,
  a plurality of first fibres arranged in the second surface of the first panel; and
  a plurality of second fibres arranged in the second surface of the second panel; and
  wherein the first panel is stacked upon the second panel such that the second surface of the first panel and the second surface of the second panel are facing each other,
  wherein the plurality of the first fibres comprises two or more layers of first fibres arranged in the first panel,
  wherein the plurality of the second fibres comprises two or more layers of second fibres arranged in the second panel, and
  wherein the first support member and second support member include a honeycomb or a foam structure and are fabricated with a material selected from at least one of: foam, plastics, paper, wood material, metal material, composite material, or any combination thereof.

Optionally an embodiment of the present disclosure provides a detector unit according wherein:
  the second surface of the first panel includes a first set of parallel grooves,
  the second surface of the second panel includes a second set of parallel grooves, the plurality of first fibres are arranged in the first set of parallel grooves of the first panel; and the plurality of second fibres are arranged in the second set of parallel grooves of the second panel;

the first set of parallel grooves and the second set of parallel grooves are configured in a lengthwise direction and are arranged at an angle to each other, the two or more layers of first fibres are arranged in an interlocking manner in the first set of parallel grooves of the first panel, and the two or more layers of second fibres are arranged in the interlocking manner in the second set of parallel grooves of the second panel.

Embodiments of the present disclosure substantially eliminate or at least partially address the aforementioned problems in the prior art, and enable the tracking accuracy and scattering angle of the high energy particles. Moreover, the detector unit is composed of low-density materials reducing weight and inherent scattering from the initial trajectory of charged particles passing through the construction materials.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In first aspect, an embodiment of the present disclosure provides a detector unit for tracking high energy particles, the detector unit comprising:

a first panel having a first surface and a second surface opposite to the first surface, wherein the second surface of the first panel includes a first set of parallel grooves, a first support member arranged between the first surface and the second surface of the first panel, a second panel having a first surface and a second surface opposite to the first surface, wherein the second surface of the second panel includes a second set of parallel grooves, a second support member arranged between the first surface and the second surface of the second panel, a plurality of first fibres arranged in the first set of parallel grooves of the first panel; and a plurality of second fibres arranged in the second set of parallel grooves of the second panel;

wherein the first panel is stacked upon the second panel such that the second surface of the first panel and the second surface of the second panel are facing each other, wherein the first set of parallel grooves and the second set of parallel grooves are configured in a lengthwise direction and arranged at an angle to each other, wherein the plurality of the first fibres comprises two or more layers of first fibres arranged in an interlocking manner in the first set of parallel grooves of the first panel, and wherein the plurality of the second fibres comprises two or more layers of second fibres arranged in the interlocking manner in the second set of parallel grooves of the second panel.

In second aspect, an embodiment of the present disclosure provides a hodoscope for tracking high energy particles, the hodoscope comprising:

at least two detector units according to the first aspect, wherein the at least two detector units are stacked in a spaced apart manner; and a supporting arrangement for supporting the at least two detector units in the spaced apart manner.

In third aspect, an embodiment of the present disclosure provides a system for tracking high energy particles, the system comprising:

at least two hodoscopes according to the second aspect; and a processor operatively coupled to the at least two hodoscopes to receive a sensed data to analyse a sample. The present disclosure provides the aforementioned detector unit for tracking high energy particles, the aforementioned hodoscope for tracking high energy particles and the aforementioned system for tracking high energy particles. The detector unit is configured to provide a position sensitive detection of up to spatial resolution 100-200 um with 1.0 mm fibre, 50-100 um with 0.5 mm diameter fibre and also configured to provide tracking resolution of about 1 milliradian with 1.0 mm fibre. Moreover, the system is user-friendly and has a low operating cost and is physically compact. This system improves the tomographic performance of scattering-based cosmic ray tomography and enables to better harness the secondary electron beam. The system can be used in conjunction with method disclosed in patent application PCT/EP2019/05533.

Throughout the present disclosure the term "detector unit" refers to an assembly that enables the tracking and detection of high energy particles. Typically, the detector unit is configured to track the paths of high energy particles as they pass therethrough. the high energy particles that arrive at Earth from outer space are mainly protons, nuclei of hydrogen, nuclei of helium and heavier nuclei. Notably, when these high energy particles arrive at Earth, they collide with the nuclei of atoms in the upper atmosphere, thereby creating more particles, mainly pions. The charged pions gradually decay, emitting particles called muons. Moreover, the muons have very little interaction with matter and can thus travel through the atmosphere and penetrate below ground. Generally, the muons reach Earth with an average velocity of about 0.994 times the speed of light. Roughly, one muon passes (independently of the direction of the surface normal) through a 1 $cm^2$ area per minute. In this regard, these high energy particles, interacting very little with matter, can travel through metres of dense material before being stopped. Suitably, the high energy particles easily pass through the detector unit. Beneficially, the detector unit is arranged to detect the travelling path of the high energy particles.

The term "first panel and second panel" as used herein refers to a hollow (or could be also optionally semi-hollow) enclosure configured to form a body of the detector unit. Optionally, the first panel and the second panel are rectangular, square, circular, elliptical or any polygonal shape. Optionally, the high energy particles that arrive from outer space first strike the first panel and leave through the second panel. Moreover, each of the first panel and second panel comprises the first surface and the second surface. Suitably, the first surface of the first panel and the second panel is (considered) an outer surface, and the second surface of the first panel and the second panel is (considered) an inner surface. Herein the first panel and second panel are stacked up against each other. In this regard, the inner surface (second surfaces) of the first panel and the second panel are arranged upon each other. I.e. the second surface of the first panel and the second surface of the second panel are facing each other's and are in contact with each other's in a typical setup. Optionally, the first panel and the second panel are made up of laminates fabricated from acrylic, polyvinyl chloride and the like. Furthermore, the first panel and the second panel comprise the first set of parallel grooves and the second set of parallel grooves on the inner surface, respectively.

The term "first set of parallel grooves and second set of parallel grooves" as used herein refers to a passage formed throughout the inner surface of the first panel and the second panel to allow the plurality of first fibres and the plurality of second fibres to arrange therein. Moreover, the parallel grooves allow the plurality of first and second fibres to be positioned in a straight line, preventing any overlapping. Optionally, the first set of parallel grooves and second set of parallel grooves forms a channel. It will be appreciated that the shape of the channel may have a semi-circular cross-section, rectangular cross-section, or square cross-section.

Optionally, the pitch of the first set of parallel grooves and the second set of parallel grooves formed in the first panel and the second panel, respectively are in the range of 0.2 mm to 10 mm or could be even more. The term "pitch" as used herein refers to the distance between the centre of an adjacent parallel groove. The pitch of the first set of parallel grooves and the second set of parallel grooves formed in the first and second panel may be from 0.2, 0.6, 0.8, 1, 2 or 1.6 mm up to 0.6, 0.8, 1, 2, 1.6 or 2 mm, respectively.

Optionally, the angle between the first set of parallel grooves and the second set of parallel grooves are in the range of 45° to 135°. It will be appreciated that the first set of parallel grooves arranged over the second set of parallel grooves are at an angle in the range of 45° to 135°. The angle between the first set of parallel grooves and the second set of parallel grooves may be from 45, 55, 65, 75, 85, 95, 105, 115 or 1250 up to 55, 65, 75, 85, 95, 105, 115, 125 or 135°, respectively. Optionally, the first set of parallel grooves are orthogonal to the second set of parallel grooves. In this regard, the first set of parallel grooves are arranged at 90° angle to the second set of parallel grooves. Beneficially, the orthogonal arrangement enables to minimise the gaps between the plurality of first fibres and the plurality of second fibres to enable effective tracking of the high energy particles. Beneficially, the orthogonal arrangement enables also in maximising the positional resolution on 2D plane equally in x and y-directions.

The term "first fibres and second fibres" as used herein refers to the set of fibres in which the high energy particles partially deposit their kinetic energy and convert the deposited energy into a visible photon. Suitably, the plurality of first fibres are arranged in the first set of parallel grooves and the plurality of second fibres are arranged in the second set of parallel grooves. Moreover, the plurality of first fibres and the second fibres consists of a core and a cladding. Furthermore, the core is a cylinder of glass or plastic that runs along the length of the plurality of first fibres and the second fibres configured to guide the light along with the core. The cladding having a lower index of refraction surrounding the core. Additionally, the core of the first fibres and the second fibres comprises a combination of fluorescent dopants arranged to produce the desired flash of visible or ultraviolet light. Optionally, the plurality of first fibres and the plurality of second fibres are scintillating fibres. In this regard, the scintillating fibres are designed to produce scintillation light when the high energy particles strike over the detection plate and also guide the photons with minimal self-absorption. Optionally, the scintillation fibres produce blue or green light when the high energy particle strike thereon.

Optionally, the plurality of first fibres and the plurality of second fibres are selected from at least one of: plastic, glass, or any combination thereof. Optionally, the plurality of first fibres and the plurality of second fibres are fabricated from plastic. Optionally, the plurality of first fibres and the plurality of second fibres are fabricated from glass. Optionally, the plurality of first fibres and the plurality of second fibres are fabricated from plastic and glass.

Optionally, a diameter of the plurality of first fibres and the plurality of second fibres are in a range of 0.2 millimetre to 10 millimetre. The diameter of the plurality of first fibres and the plurality of second fibres may be as example from 0.2, 0.6, 0.8, 1, 2 or 1.6 mm up to 0.6, 0.8, 1, 2, 1.6 or 2 mm or even up to 10 mm. Optionally, the diameter of the first set of parallel grooves and second set of parallel grooves are complementary to the plurality of first fibres and the plurality of second fibres, respectively.

The term "interlocking manner" as used herein refers to the arrangement of the plurality of first fibres and the plurality of second fibres in the closed packed structure. In this regard, the plurality of first fibres and the plurality of second fibres are arranged most efficiently and stacked such that to fill the empty space in-between. Moreover, each of the plurality of first fibres and second fibres arranged in the interlocking manner prevents the movement therein. Optionally, the plurality of first fibres and the plurality of second fibres of the first panel and the second panel, respectively, form a fibre-mat. It will be appreciated that the interlocking manner arrangement of the plurality of first fibres and the plurality of second fibres of the first panel and the second panel, respectively, forms the fibre-mat. The term "fibre-mat" as used herein refers arrangement of the plurality of first fibres (possibly also the plurality of the second fibers) such that is forms a mat. Optionally, the fiber mat can mean also one plate with plurality of fibres in one direction.

Beneficially, the detection unit enables high accuracy in 2D tracking the position of the high energy particles.

The term "first support member and second support member" as used herein refers to a structure that is configured to hold the first surface and the second surface of the first panel and the second panel, respectively. Optionally, the support member is arranged to provide the alignment between the first surface and the second surface of the first panel and the second panel, respectively. Such alignment helps the first panel and the second panel to stack upon each other efficiently. Herein, the first support member is arranged between the first surface and the second surface of the first panel and the second support member is arranged between the first surface and the second surface of the second panel. The support member is arranged to allow the strength to the detector unit.

The first support member and the second support member is fabricated with a material selected from at least one of: foam, plastics, wood, metal, composite material, paper, or any combination thereof. Optionally, the support member is fabricated from foam. Optionally, the support member is fabricated from plastic. Optionally, the support member is fabricated from wood. Optionally, the support member is fabricated from metal. Optionally, the support member is fabricated from composite material. It will be appreciated that the material used to fabricate the support member is configured to reduce the overall weight of the detector unit and at the same time provide strength thereof. Optionally, a low-density material (composed beneficially of low-Z materials) is selected for the first support member and the second support member. Technical effect of selecting such a low-density (or low-Z) material is that in this way the detector unit does not interfere with muons as much as higher density material. This improves detection accuracy as possible scattering from the detector unit are reduced. The first support member and the second support member include a honeycomb structure. In this regard, the first support member and the second support member include the honeycomb or foam structure between the first surface and the second surface. The term "honeycomb structure" as used herein refers to the hollow cells or tubes sandwiched between the first surface and the second surface. Moreover, the hollow cell is columnar or hexagonal in shape. Beneficially, the honeycomb structure allows in reducing the amount of material used to reach minimal weight and minimal material multiple scattering effect for traversing muons by the construction material. Furthermore, the honeycomb structure has a load carry and load transference greater than laminates. Optionally, each of the first panel and the second panel is selected from one of:
- a square shape having an area in a range of 0.2 metre$^2$ (m$^2$) to 10 metre$^2$ (m$^2$), or
- a rectangular shape having an area in a range of 0.2 m$^2$ to 10 m$^2$,
- a triangle shape having an area in a range of 0.2 m$^2$ to 10 m$^2$, or
- a oval shape having an area in a range of 0.2 m$^2$ to 10 m$^2$, or
- a curved shape having an area in a range of 0.2 m$^2$ to 10 m$^2$, or
- a circle shape having an area in a range of 0.2 m$^2$ to 10 m$^2$, or
- a hexagonal shape having an area in a range of 0.2 m$^2$ to 10 m$^2$.

The first panel and the second panel having square shape having an area that may be from 0.2, 0.8, 1.4, 2, 2.6, 3.2, 3.8, 4.4, 5, 5.6, 6.2, 6.8, 7.4, 8, 8.6 or 9.4 m up to 0.8, 1.4, 2, 2.6, 3.2, 3.8, 4.4, 5, 5.6, 6.2, 6.8, 7.4, 8, 8.6, 9.4 or 10. The first panel and the second panel having triangle shape having an area that may be from 0.2, 0.8, 1.4, 2, 2.6, 3.2, 3.8, 4.4, 5, 5.6, 6.2, 6.8, 7.4, 8, 8.6 or 9.4 m up to 0.8, 1.4, 2, 2.6, 3.2, 3.8, 4.4, 5, 5.6, 6.2, 6.8, 7.4, 8, 8.6, 9.4 or 10. The first panel and the second panel having oval shape having an area that may be from 0.2, 0.8, 1.4, 2, 2.6, 3.2, 3.8, 4.4, 5, 5.6, 6.2, 6.8, 7.4, 8, 8.6 or 9.4 m up to 0.8, 1.4, 2, 2.6, 3.2, 3.8, 4.4, 5, 5.6, 6.2, 6.8, 7.4, 8, 8.6, 9.4 or 10. The first panel and the second panel having curved shape having an area that may be from 0.2, 0.8, 1.4, 2, 2.6, 3.2, 3.8, 4.4, 5, 5.6, 6.2, 6.8, 7.4, 8, 8.6 or 9.4 m up to 0.8, 1.4, 2, 2.6, 3.2, 3.8, 4.4, 5, 5.6, 6.2, 6.8, 7.4, 8, 8.6, 9.4 or 10. The first panel and the second panel having circle shape having an area that may be from 0.2, 0.8, 1.4, 2, 2.6, 3.2, 3.8, 4.4, 5, 5.6, 6.2, 6.8, 7.4, 8, 8.6 or 9.4 m up to 0.8, 1.4, 2, 2.6, 3.2, 3.8, 4.4, 5, 5.6, 6.2, 6.8, 7.4, 8, 8.6, 9.4 or 10. The first panel and the second panel having hexagonal shape having an area that may be from 0.2, 0.8, 1.4, 2, 2.6, 3.2, 3.8, 4.4, 5, 5.6, 6.2, 6.8, 7.4, 8, 8.6 or 9.4 m up to 0.8, 1.4, 2, 2.6, 3.2, 3.8, 4.4, 5, 5.6, 6.2, 6.8, 7.4, 8, 8.6, 9.4 or 10.

The present disclosure also relates to the hodoscope for tracking high energy particles as described above. Various embodiments and variants disclosed above apply mutatis mutandis to the hodoscope for tracking high energy particles.

The term "hodoscope" as used herein refers to a device configured to detect the high energy particles and also to determine the trajectories of the high energy particles. Herein, at least two detector unit are arranged to detect and determine the trajectories of the high energy particles. Notably, the at least two detector units are stacked in a spaced apart manner. The term "supporting arrangement" as used herein refers to a rack for holding, supporting the hodoscope, such as the at least two detector units, in a certain position. The supporting arrangement receives the at least two detector units to be arranged upon each other in a spaced apart manner. The at least two detector units are oriented such that each of the at least two detector units is symmetrically placed on top of each other.

Optionally, wherein the supporting arrangement comprises:
- a plurality of rods passing through the at least two detector units; and
- a plurality of clamps holding the at least two detector units in the spaced apart manner and parallel to each other.

In this regard, the term "rod" as used herein refers to a vertical member that passes through the at least two detector units to align them thereof. The term "clamp" as used herein refers to a device that grips, clasps, or hooks the at least two detector units in the spaced apart manner. The plurality of clamps is a metal or plastic clamp working with the plurality of rods. Specifically, the plurality of rods is pushed into the plurality of clamps for secured retention thereof, and pulled out to be released. Notably, the plurality of clamps provides assistance to the coupling and uncoupling of the at least two detector units and the fixation of the at least two detector units in the operating position. Moreover, the at least two detector units are attached to the plurality of rods. Optionally, the plurality of rods is fabricated from metal, wood, plastic, ceramics and so forth. Optionally, the plurality of clamps is fabricated from metal, wood, plastic, ceramics and so forth.

Optionally, two detection units do not need to be in spaced apart manner. The bottom surface of the upper detection unit can be in physical contact with the upper surface of the bottom detector unit and the fibre layers are still spaced apart manner. Mechanically it is possible to stack all panels in immediate contact with each other. Optionally, the hodoscope further comprising a plurality of photo-sensors operable to sense light-collection from the fibre-mat. The term "photo-sensor" as used herein refers to a device used to determine the distance, absence, or presence of light. Herein, the photo-sensor(s) is/(are) arranged to sense the light emitted from the plurality of first fibres and the plurality of second fibres. It will be appreciated that the photo-sensor has sensing capability of a single photon. Optionally, the plurality of photo-sensors may be Silicon Photomultiplier (SIPM). Typically, the SiPM are arrays of single photon avalanche photodiodes operated in Geiger mode (SPADs), designed for the detection of extremely weak light, down to the single photon. Herein, the plurality of SPADs are connected in parallel to form an SIPM. Notably, the SIPM produces an electrical current as an output proportional to the number of photons hitting the sensor. Beneficially, the SIMP has high gain, very fast response and short recovery time.

Optionally, the hodoscope further comprising a plurality of mirrors arranged to the first panel and the second panel. In this regard, the plurality of mirrors are placed on the opposite side of the fibre mat to reflect light back towards the photo-sensors. Suitably, each of the plurality of mirrors are arranged to reflect the light produced by the plurality of first fibres and the plurality of second fibres. Notably, the light reflected is moved toward the photo-sensor to be sensed thereof. In one example the mirrors are arranged on a first end of each of the fibers and the photo-sensor(s) are arranged on a second end of each of the fibers. The mirrors are arranged to reflect photons from the first ends towards the second ends. This way signal to noise ration photon detection with the photo-senor is improved as we can also capture photons which are going towards the first end(s) since those are reflected back. In deed a first mirror is arranged on a first end of plurality of the first fibres and a second mirror is arranged on a first end of plurality of the second fibres. Sensors (one sensor per fibre) are arranged on a second end of each of the plurality of the first fibres and sensors (one sensor per fibre) are arranged on a second end of each of the plurality of the second fibres.

The present disclosure also relates to the system for tracking high energy particles as described above. Various embodiments and variants disclosed above apply mutatis mutandis to the system for tracking high energy particles.

In this regard, the aforementioned system enables high tracking accuracy (about 1 milliradian) of the high energy particles. Moreover, the use of the at least three detector plates also enable momentum estimation and flux of the high energy particles when combined with the method disclosed in patent application PCT/EP2019/05533. Beneficially, the system is light-weighted to reduce/minimize the scattering effect of the high energy particle. Furthermore, the system has a modular design and can be used to design larger systems. In addition, the design of the system is very compact and thus enables indoor applications and can also be utilised where space is very limited.

The term "processor" as used herein refers to a hardware, software, firmware, or a combination of these configured to control operation of the system. In this regard, the processor performs several complex processing tasks. The processor is communicably coupled to other components of the system wirelessly and/or in a wired manner. In an example, the processor may be implemented as a programmable digital signal processor (DSP). In another example, the processor may be implemented via a cloud server that provides a cloud computing service. Optionally, the processor is communicably coupled to the at least two hodoscopes using a communication network. The communication network may be a wired network, a wireless network, or any combination thereof. Examples of the communication network include, but are not limited to, Local Area Networks (LANs), Wide Area Networks (WANs), Internet, radio networks and telecommunication networks. It will be appreciated that the processor is operably coupled with the at least two hodoscopes configured to track the high energy particles.

Optionally, the at least two hodoscopes comprise a volume to accommodate the sample therein. It will be appreciated that the at least two hodoscopes are arranged in the spaced apart manner. Typically, the space between the at least two hodoscopes form the volume thereof, the said volume is utilised to place the sample to determine the sample. Generally, each material has different scattering densities for the high energy particle. Based on the scattering parameter the sample can be determined. For example, the uranium having the atomic number-92 is placed in the volume. The system identifies the sample based on the obtained or calculated scattering angles (determined in volume) in the volume.

Optionally, in the system the detector units are formed so, that there are fibers on both sides (on the surface of the panel, or inside the panel) of one panel.

Optionally, in the detector unit it might be only indications applied on the surface of the panels where the fibers should be put, for example so that there are lines drawn at the surface of the panel/panels showing places for the fibers.

Optionally, the system comprises a processor operatively coupled to a hodoscope of the orthogonal pair.

Optionally, the detector unit comprises only of one panel.

Optionally, the fibre mat—plurality of fibres arranged in one and same direction. In current mechanical design, it is produced as an assembly of two layers of fibres on a surface of a panel. This enables 1D detection resolution.

Optionally, the detector unit—plurality of fibres arranged in two directions, this enables 2D detection resolution. With current mechanical design it means placing orthogonally two fibre mats with two panels face to face.

Optionally there are two panels with two groups of plurality of fibres arranged at an angle with respect to each other. The two fibre mats could be assembled in principle onto one panel. One direction of fibres on one surface, the orthogonal direction of fibres on the other surface of the same panel. This enables also 2D detection resolution.

Optionally, in the system, the detector unit having a plurality of first fibres and the plurality of second fibres of the first panel and the second panel, respectively, forms a position sensitive, 2D particle detector.

Optionally the plurality of first fibres and the plurality of second fibres of the first panel and the second panel, respectively, are formed by minimum of two a fibre-mats. Fibre-mats can be in other words considers to comprise of plurality of fibres (first fibre-mat from plurality of first fibres and second fibre-mat from plurality of second fibres).

The system may be used in tomographic scanners (or the system is practically a tomographic system itself) for security applications (such as parcels, personal luggage, vehicles, humans, trucks or cargo containers, etc., nuclear waste barrels, imaging of nuclear installations and the like) and can also be utilised as a telescope for radiographic measurements (such as infrastructure such as concrete bridges, buildings, other radiographic measurements and the like).

As a summary a detector unit for tracking high energy particles is provided. The detector unit comprises a first panel having a first surface and a second surface opposite to the first surface. The panel is typically rectangular and there is a distance d between the first surface and the second surface. This distance and the surfaces define a volume which is filled with a first support member, which is arranged between the first surface and the second surface of the first panel. This way we obtain a robust detector unit which helps to obtain accurate measurement results.

In addition to the first panel the detector unit comprises a second panel which is structurally similar to the first panel. The second panel has a first surface and a second surface opposite to the first surface and a second support member arranged between the first surface and the second surface of the second panel. Since the first panel and the second panel are structurally similar (or same) this makes manufacturing easy. Only one type of panel is needed (from manufacturing point of view).

There is a plurality of first fibres arranged in the second surface of the first panel and a plurality of second fibres arranged in the second surface of the second panel. The first panel is stacked upon the second panel such that the second surface of the first panel and the second surface of the second panel are facing each other. Since the second surfaces are facing each others (and are preferably in contact with each others) distance between the first fibres and the second fibres is minimized. This ensures accurate position sensitive detection of muon as it goes thru the first and the second panel. Indeed "xy" co-ordinate of muon going thru the stack of panels can be obtained accurately.

Furthermore the plurality of the first fibres comprises two or more layers of first fibres arranged in the first panel, and the plurality of the second fibres comprises two or more layers of second fibres arranged in the second panel. This way it is ensured that most of the muons going thru panels are detected as there is no or very small gaps between the fibre layers. The first support member and second support member include a honeycomb or a foam structure and are fabricated with a material selected from at least one of: foam, plastics, paper, wood material, metal material, composite material, or any combination thereof.

DETAILED DESCRIPTION OF THE DRAWINGS

Figure 1:
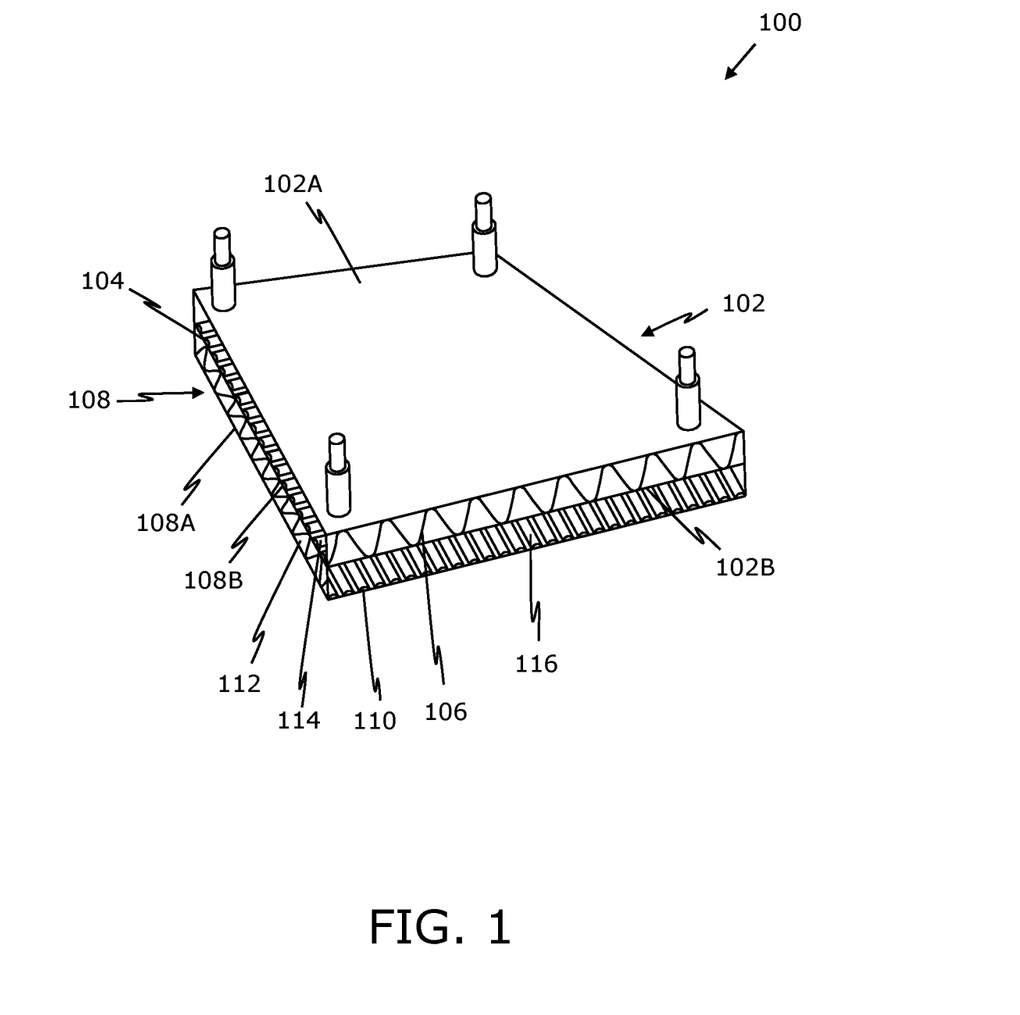
FIG. 1 is a perspective view of a detector unit for tracking high energy particles, in accordance with an embodiment of the present disclosure.

Referring to FIG. 1, illustrated is a perspective view of a detector unit 100 for tracking high energy particles, in accordance with an embodiment of the present disclosure. As shown, the detector unit 100 comprises a first panel 102 having a first surface 102A and a second surface 102B opposite to the first surface 102A, wherein the second surface 102B of the first panel 102 includes a first set of parallel grooves 104. Moreover, the first panel 102 having a first support member 106 arranged between the first surface 102A and the second surface 102B. The detector unit 100 further comprises a second panel 108 having a first surface 108A and a second surface 108B opposite to the first surface 108A, wherein the second surface 108B of the second panel 108 includes a second set of parallel grooves 110. Furthermore, the second panel 108 having a second support member 112 arranged between the first surface 108A and the second surface 108B. The detector unit 100 further comprises a plurality of first fibres 114 arranged in the first set of parallel grooves 104 of the first panel 102 and a plurality of second fibres 116 arranged in the second set of parallel grooves 110 of the second panel 108.

Figure 3:
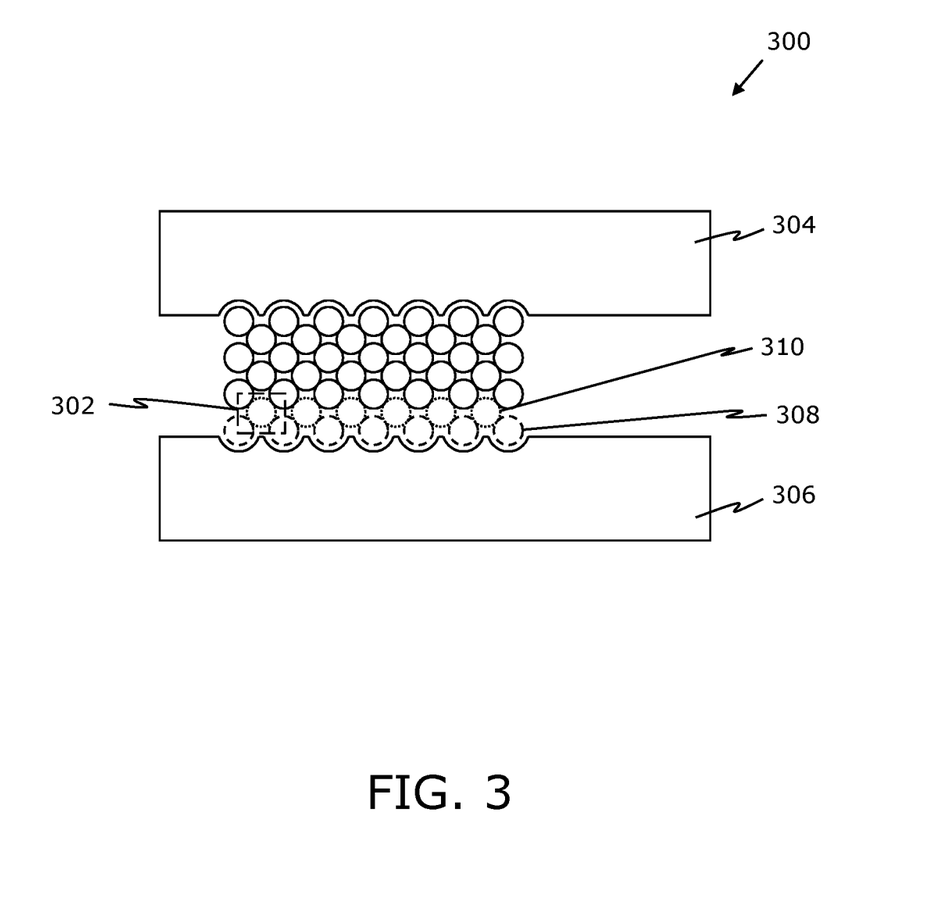
FIG. 3 is a front view of an arrangement of fibres arranged in an interlocking manner, in accordance with an embodiment of the present disclosure.

Notably, the first panel 102 is stacked upon the second panel 108 such that the second surface 102B of the first panel 102 and the second surface 108B of the second panel 108 are facing each other. The first set of parallel grooves 104 and the second set of parallel grooves 110 are configured in a lengthwise direction and arranged at an angle to each other. Moreover, the plurality of the first fibres 114 comprises two or more layers of first fibres arranged in an interlocking manner in the first set of parallel grooves 104 of the first panel 102 and the plurality of the second fibres 116 comprises two or more layers of second fibres arranged in the interlocking manner (as shown in FIG. 3) in the second set of parallel grooves 110 of the second panel 108. Furthermore, the first set of parallel grooves 104 are orthogonal to the second set of parallel grooves 110.

Figure 2:
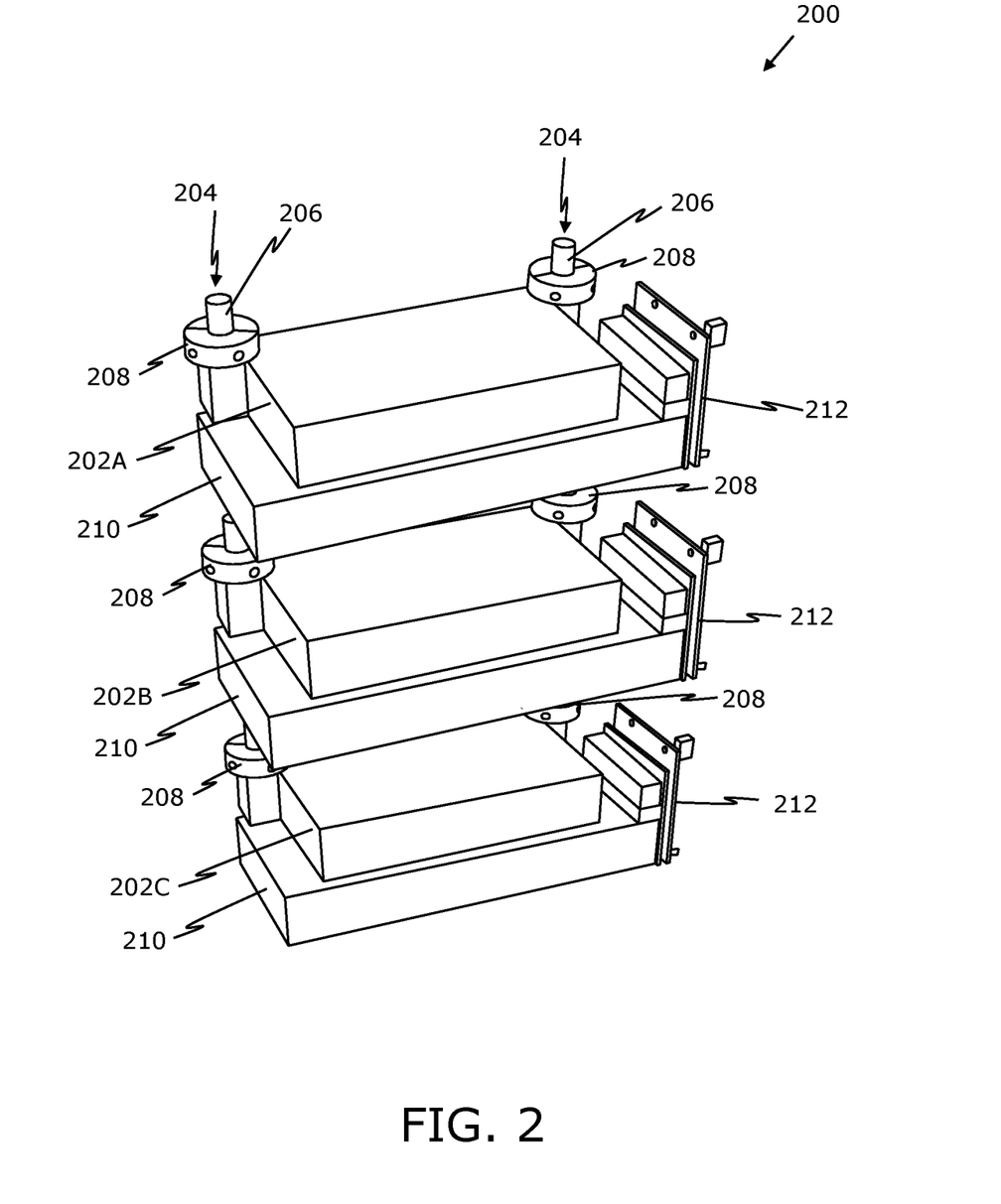
FIG. 2 is a perspective view of a hodoscope for tracking high energy particles, in accordance with an embodiment of the present disclosure.

Referring to FIG. 2, illustrated is a perspective view of a hodoscope 200 for tracking high energy particles, in accordance with an embodiment of the present disclosure. As shown, the hodoscope 200 comprises at least two detector units 202. Herein, the three detector units 202A, 202B, 202C (collectively referred as 202) are stacked in a spaced apart manner. The hodoscope further comprises a supporting arrangement 204 for supporting the at least two detector units 202 in the spaced apart manner. Notably, the supporting arrangement 204 comprises a plurality of rods 206 passing through the at least two detector units 202 and a plurality of clamps 208 holding the at least two detector units 202 in the spaced apart manner and parallel to each other.

The hodoscope 202 further comprises a plurality of mirrors 210 arranged the at least two detector units 202. Moreover, the hodoscope 202 further comprises a plurality of photo-sensors 212 operable to sense light-collection from the at least two detector units 202.

Referring to FIG. 3, illustrated is a front view of an arrangement of fibres 300 arranged in an interlocking manner 302, in accordance with an embodiment of the present disclosure. As shown, the fibre 300 comprises two or more layers of fibres arranged between a first panel 304 and a second panel 306. Not shown the figure, but it might be that the fibres comprise two or more layers of fibres arranged on a surface of the second panel 306. The first layer 308 (shown as dashed line) is arranged adjacent to each other such that the each of the fibre is connected to each other. The second layer 310 (shown as dashed line) is arranged over the first layer 308 such that the fibres of the second layer 310 is place is the space between the first layer 308.

Figure 4:
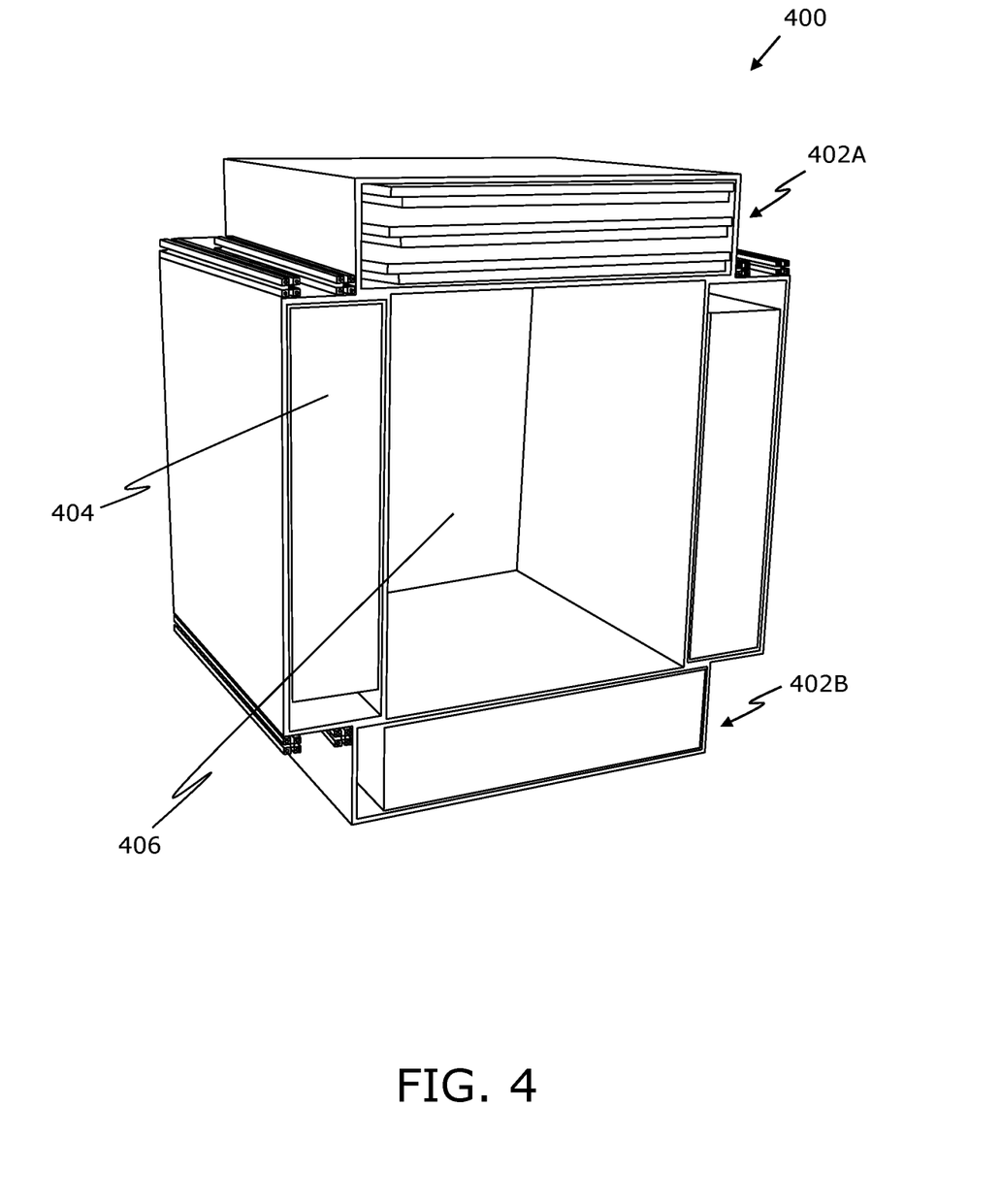
FIG. 4 is a perspective view of a system for tracking high energy particles, in accordance with an embodiment of the present disclosure

Referring to FIG. 4, illustrated is a perspective view of a system 400 for tracking high energy particles, in accordance with an embodiment of the present disclosure. As shown, the system 400 comprises at least two hodoscopes 402A and 402B collectively referred as 402. The system further comprises a processor 404 operatively coupled to the at least two hodoscopes 402 to receive a sensed data to analyse a sample. Moreover, the at least two hodoscopes 402 comprises a volume 406 to accommodate the sample therein. It might be optionally, that the system comprises a processor operatively coupled to a hodoscope of the orthogonal pair.

Figure 5:
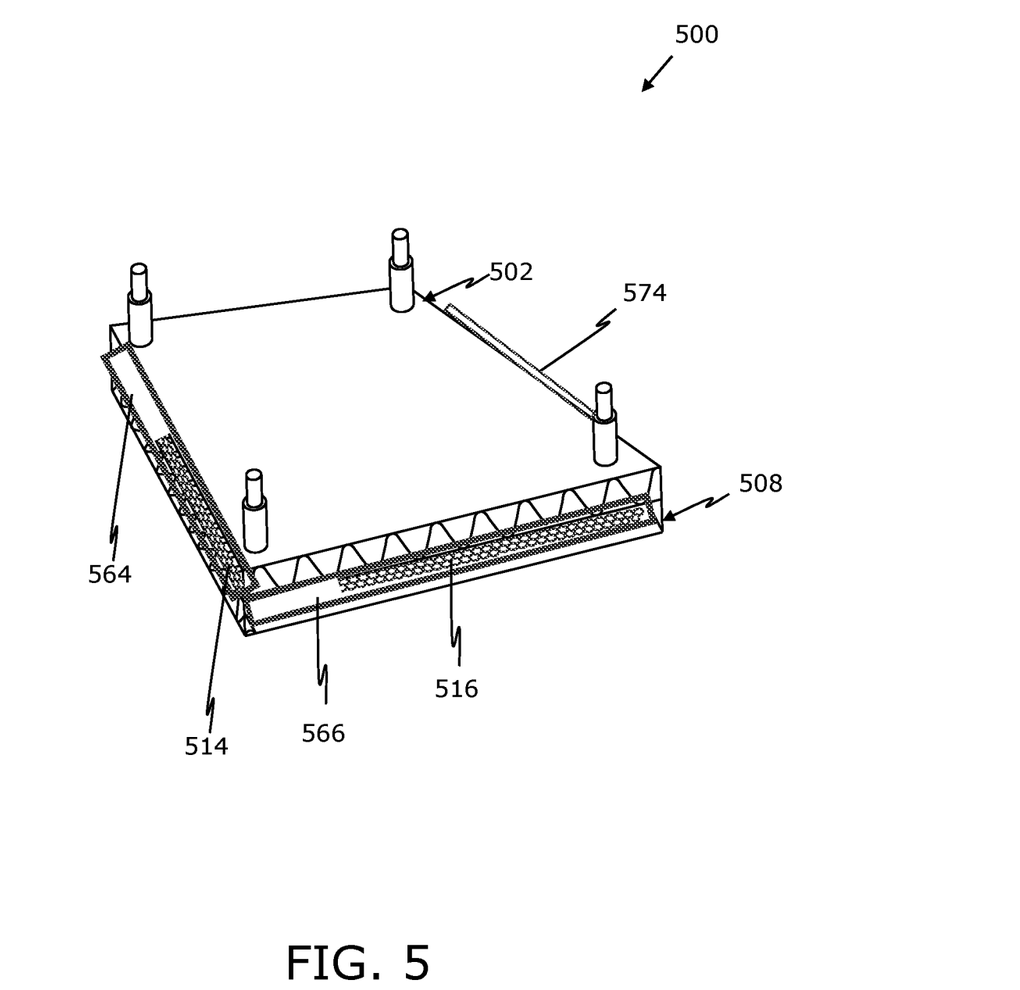
FIG. 5 is a is a perspective view of a detector unit for tracking high energy particles, in accordance with an embodiment of the present disclosure.

Referring to FIG. 5. is a perspective view of a detector unit 500. The detector unit comprises a first panel 502 and a second panel 508. A plurality of first fibers 514 are arranged on a second surface of the first panel 502. The plurality of first fibres 514 are arranged in an interlocking manner as illustrated. In a same way a plurality of second fibers 516 are arranged on a second surface of the second panel 508 in an interlocking manner. As illustrated the plurality of the first fibres 514 are in a right angle in respect to the plurality of the second fibres 516. At least some of the plurality of first fibres are in contact with the plurality of second fibres. In the figure is indicated a first mirror 564 which is arranged on a first end of plurality of the first fibres. The first mirror 564 is drawn with a thick line and it is illustrated in a semi-transparent way to see the (first) ends of the fibres. In similar manner a second mirror 566 is arranged on a first end of plurality of the second fibres 516. This way photons are reflected from the first ends towards second ends. A first set of sensors 574 are arranged on a second end of the first set of fibres. A second set of sensors (behind the detector, not visible in the figure) are arranged on a second end of the second set of fibres. In the system, the detector unit having a plurality of first fibres and the plurality of second fibres of the first panel and the second panel, respectively, forms a position sensitive, 2D particle detector.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A detector unit for tracking high energy particles, the detector unit comprising:
a first panel having a first surface and a second surface opposite to the first surface,
a first support member arranged between the first surface and the second surface of the first panel,
a second panel having a first surface and a second surface opposite to the first surface,
a second support member arranged between the first surface and the second surface of the second panel,
a plurality of first fibres arranged in the second surface of the first panel; and
a plurality of second fibres arranged in the second surface of the second panel; and
wherein the first panel is stacked upon the second panel such that the second surface of the first panel and the second surface of the second panel are facing each other,
wherein the plurality of the first fibres comprises two or more layers of first fibres arranged in the first panel,
wherein the plurality of the second fibres comprises two or more layers of second fibres arranged in the second panel, and
wherein the first support member and second support member include a honeycomb or a foam structure and are fabricated with a material selected from at least one of: foam, plastics, paper, wood material, metal material, composite material, or any combination thereof,
wherein each of the first support member and the second support member comprises a honeycomb structure having hollow cells that are columnar or hexagonal in shape, and formed of a low-density low-Z material.

2. The detector unit according to claim 1 wherein:
the second surface of the first panel includes a first set of parallel grooves,
the second surface of the second panel includes a second set of parallel grooves,
the plurality of first fibres arranged in the first set of parallel grooves of the first panel; and
the plurality of second fibres arranged in the second set of parallel grooves of the second panel;
the first set of parallel grooves and the second set of parallel grooves are configured in a lengthwise direction and are arranged at an angle to each other,
the two or more layers of first fibres are arranged in an interlocking manner in the first set of parallel grooves of the first panel, and
the two or more layers of second fibres are arranged in the interlocking manner in the second set of parallel grooves of the second panel.

3. The detector unit according to claim 1, wherein a diameter of the plurality of first fibres and the plurality of second fibres are in a range of 0.2 millimetre to 10 millimetre.

4. The detector unit according to claim 2, wherein a pitch of the first set of parallel grooves and the second set of parallel grooves formed in the first panel and the second panel, respectively are in range of 0.2 mm to 10 mm.

5. The detector unit according to claim 1, wherein the plurality of first fibres and the plurality of second fibres are scintillating fibres.

6. The detector unit according to claim 1, wherein the angle between the first set of parallel grooves and the second set of parallel grooves are in range of between 45 to 135 degrees.

7. The detector unit according to claim 1, wherein the first set of parallel grooves are orthogonal to the second set of parallel grooves.

8. The detector unit according to claim 1, wherein the plurality of first fibres and the plurality of second fibres of the first panel and the second panel, respectively, are formed by minimum of two a fibre-mats.

9. The detector unit according to claim 1, wherein the second surface of the first panel and the second surface of the second panel are in contact with each other.

10. The detector unit according to claim 1, wherein a first mirror (is arranged on a first end of plurality of the first fibres and a second mirror is arranged on a first end of plurality of the second fibres.

11. The detector unit according to claim 1, wherein each of the first panel and the second panel is selected from one of:
a square shape having an area in a range of 0.2 metre$^2$ (m$^2$) to 10 metre$^2$ (m$^2$), or
a rectangular shape having an area in a range of 0.2 m$^2$ to 10 m$^2$, or a triangle shape having an area in a range of 0.2 m² to 10 m², or an oval shape having an area in a range of 0.2 m² to 10 m², or a 2D or 3D curved shape having an area in a range of 0.2 m² to 10 m², or a circle shape having an area in a range of 0.2 m² to 10 m², or a hexagonal shape having an area in a range of 0.2 m² to 10 m².

12. A hodoscope for tracking high energy particles, the hodoscope comprising:

at least two detector units according to claim 1, wherein the at least two detector units are stacked; and a supporting arrangement for supporting the at least two detector units.

13. The hodoscope according to claim 12, wherein the supporting arrangement comprises:

a plurality of rods passing through the at least two detector units; and a plurality of clamps holding the at least two detector units.

14. A system for tracking high energy particles, the system comprising:

at least two hodoscopes according to claim 11; and a processor operatively coupled to the at least two hodoscopes to receive a sensed data to analyse a sample.

15. The system according to claim 14, wherein the at least two hodoscopes comprise a volume to accommodate the sample therein.

16. A system according to claim 14, wherein the system is a tomographic system.

* * * * *